3,388,022
METHOD OF BONDING TOGETHER BUILDING PANELS AND TWO-COMPONENT ADHESIVE COMPOSITION USED THEREFOR
Martin S. Bloom and Michael Roy Sharpe, Norton-on-Tees, England, assignors to Imperial Chemical Industries Limited, London, England, a corporation of Great Britain
No Drawing. Filed Feb. 19, 1965, Ser. No. 434,136
Claims priority, application Great Britain, Feb. 24, 1964, 7,577/64
14 Claims. (Cl. 156—326)

ABSTRACT OF THE DISCLOSURE

Bonding together building panels or the like, which comprises the steps of forming a mixture of plaster and water in the presence of sufficient alkali to obtain substantial retardation of the setting time of the mixture, and subsequently applying the alkaline mixture to the surfaces to be bonded in the presence of sufficient acid to accelerate the set. The acid may be added to the mixture, or it may be applied to the surfaces to be bonded, immediately before application of the adhesive, or it may already be contained in the material of the panels themselves.

---

The present invention relates to a method of, and adhesive for, cementing together building panels or the like, in particular cast gypsum wall panels.

Such panels may, for example, be tongued and grooved, and made precisely to very small tolerances, for example of the order of about ±0.004 inch, so that it is possible to make walls from these panels with the joints invisible after painting. This, however, requires a special gypsum adhesive, as opposed to a gypsum mortar or plaster. Such an adhesive should, most conveniently, have a "pot life" of several hours, but set rapidly when brought into contact with two adjacent panels (so that a bond, strong enough to hold a wall together, is formed within a few minutes) and should be capable of forming a bond whose ultimate strength is of the order of that of the panels.

The invention accordingly provides a method of bonding together building panels or the like, which comprises the steps of forming a mixture of plaster and water with sufficient quantity of a retarding agent to obtain substantial retardation of the setting time of the mixture, and subsequently applying the retarded mixture to the surfaces to be bonded in the presence of a sufficient quantity of an accelerating agent to reduce its setting time so as to accelerate bonding of the surfaces.

Whereas a mixture of water and plaster obtained from phosphate rock by-product gypsum will normally set fairly rapidly, the addition of alkali has been found to prolong its setting time to a maximum point beyond which the addition of further alkali will cause a decrease in its setting time. We have found that starting with a slurry of water and plaster obtained from phosphate rock by-product gypsum having a pH of about 5, the gradual addition of lime caused prolongation of its setting time which reached its maximum when the pH was about 8.5 and that the addition of further lime decreased its setting time. At pH 8.5, the setting time or "pot life" of the mixture was between 3 and 4 hours. The pH value at which maximum retardation occurs varies according to the nature and origin of the plaster ingredient, but we have found that in all cases there is an optimum alkaline pH value below and above which the setting time of the mixture is accelerated. In some cases, for example, we have found the optimum pH value to be 10, and in other cases 12.

If this retarded alkaline mixture is now rendered acidic, for example by the addition of, or by contact with, a suitable acid, for example sulphuric or phosphoric acid, its setting time can be reduced from 3 or 4 hours down to about 10 minutes. Thus, if the panels have been formed from acidic plaster obtained from phosphate rock by-product gypsum, they may be sufficiently acidic so to reduce the pH value of the adhesive, when it is applied thereto, as to obtain an accelerated set without the necessity of using additional acid, and the acidity of the panels may, conveniently, be adjusted for this purpose during their formation and casting. On the other hand, if the panels are alkaline, or neutral, or only slightly acidic, acidification of the adhesive mixture, with a view to accelerating its set, may be effected either by direct addition of acid to the adhesive mixture immediately before use, or by coating the surfaces to be bonded with acid before the adhesive is applied thereto, the acid being present in such quantity as to reduce the pH value of the adhesive sufficiently to accelerate its set and the bonding of the panels to a convenient extent.

In one particular embodiment, therefore, the invention provides a method of bonding together building panels or the like, which comprises the steps of forming a mixture of plaster and water in the presence of sufficient alkali to obtain substantial retardation of the setting time of the mixture, and subsequently applying the alkaline mixture to the surfaces to be bonded in the presence of sufficient acid to accelerate the set. The acid may be added to the mixture, or it may be applied to the surfaces to be bonded, immediately before application of the adhesive, or it may already be contained in the material of the panels themselves.

Plaster panels are porous, and when the thin layer of adhesive comes into contact with the panels, its water content is sucked into the pores by capillary forces, with the result that the adhesive sets with a low strength as it has insufficient water available for proper hydration. This suction effect can be counteracted by means of a suitable additive, for example methyl cellulose, which may either be incorporated in the adhesive mixture or applied separately to the surfaces to be bonded before applying the adhesive mixture thereto.

In one experiment, an adhesive mixture was formed from plaster, sufficient lime (0.2%) to produce a pH of 8.5 and between 1% and 2% methyl cellulose. This was mixed in a water-to-solids ratio of 0.8, and the mixture was found to have a "pot life" of between 3 and 4 hours. The mixture was applied as a thin film to a pair of plaster blocks, and set in about 10 minutes, by which time it had developed a tensile strength of the order of 25 lb./sq. inch which was sufficient to hold the blocks together. The adhesive reached an ultimate tensile strength which approached that of the plaster blocks, viz. about 80 lb./sq. inch.

In another experiment, a two-component adhesive was tested, comprising a first component formed from plaster with sufficient lime (0.2%) to produce a pH of 8.5 and mixed in a water-to-solids ratio of 0.8, and a second component consisting of a solution of methyl cellulose in phosphoric acid and water. The surfaces to be bonded were first coated with the methyl cellulose solution and thereafter with a thin film of the plaster/lime mixture. A setting time of about 5 minutes was obtained, with approximately the same strengths as before.

The optimum mix for an adhesive in accordance with the invention varies for plaster panels of different porosities and acidity. Other celluloses, preferably those which are more soluble than methyl cellulose, or other substances having similar properties, for example gelatine, may be in place of the latter.

The invention also includes a two-component adhesive for bonding together building panels or the like consisting of a first component comprising plaster and sufficient alkali, for example lime, to obtain substantial retardation of the setting time of the plaster when mixed with water, and a second component comprising a mixture of a water-retaining additive, for example methyl cellulose, with an acid, for example sulphuric or phosphoric acid.

To produce almost invisible joints, it is preferable to mix the adhesive from the same type of plaster from which the blocks are made, owing to differences in colour of such plasters.

What is claimed is:

1. A method of bonding together building panels and the like, which comprises the steps of forming a mixture of plaster and water with sufficient quantity of a retarding agent to obtain substantial retardation of the setting time of the mixture, and subsequently applying the retarded mixture to the surfaces to be bonded in the presence of a sufficient quantity of an accelerating agent to reduce its setting time so as to accelerate bonding of the surfaces.

2. A method as claimed in claim 1, wherein said accelerating agent is added to said retarded mixture immediately before use.

3. A method as claimed in claim 1, wherein said accelerating agent is applied to the surfaces to be bonded prior to the application thereto of said retarded mixture.

4. A method as claimed in claim 1, wherein said accelerating agent is incorporated in the building panels during formation thereof.

5. A method of bonding together building panels and the like, which comprises the steps of forming a mixture of plaster and water with sufficient alkali to obtain substantial retardation of the setting time of the mixture, and subsequently applying the retarded mixture to the surfaces to be bonded in the presence of sufficient acid to reduce its setting time so as to accelerate bonding of the surfaces.

6. A method as claimed in claim 5, wherein said alkali is lime.

7. A method as claimed in claim 5, wherein said acid is selected from the group consisting of sulphuric acid and phosphoric acid.

8. A method of bonding together building panels and the like, which comprises the steps of forming a mixture of plaster and water with sufficient quantity of a retarding agent to obtain substantial retardation of the setting time of the mixture, and subsequently applying the retarded mixture to the surfaces to be bonded in the presence of a water-retaining additive and sufficient quantity of an accelerating agent to reduce its setting time so as to accelerate bonding of the surfaces.

9. A method as claimed in claim 8, wherein said water-retaining additive is methyl cellulose.

10. A method as claimed in claim 8, wherein said water-retaining additive is added to said mixture of plaster and water.

11. A method as claimed in claim 8, wherein said water-retaining additive is applied to the surfaces to be bonded prior to the application thereto of said mixture of plaster and water.

12. A method of bonding together building panels or the like, which comprises the steps of forming a mixture of plaster and water with sufficient lime to obtain substantial retardation of the setting time of the mixture, and subsequently applying the retarded mixture to the surfaces to be bonded in the presence of methyl cellulose and sufficient quantity of an acid selected from the group consisting of sulphuric acid and phosphoric acid to reduce its setting time so as to accelerate bonding of the surfaces.

13. A two-component adhesive for bonding together building panels and the like consisting of a first component comprising plaster and sufficient retarding agent to obtain substantial retardation of the setting time of the plaster when mixed with water, and a second component comprising a mixture of a water-retaining additive and an accelerating agent.

14. A two-component adhesive for bonding together building panels and the like consisting of a first component comprising plaster and sufficient lime to obtain substantial retardation of the setting time of the plaster when mixed with water, and a second component comprising a solution of methyl cellulose in an acid, selected from the group consisting of sulphuric acid and phosphoric acid, and water.

References Cited

UNITED STATES PATENTS

| | | | |
|---|---|---|---|
| 2,990,382 | 6/1961 | Wagner et al. | 156—71 X |
| 3,298,883 | 1/1967 | Lemelson | 156—71 |
| 1,898,636 | 2/1933 | Linzell | 106—110 X |
| 1,900,381 | 3/1933 | Hansen | 106—110 |
| 2,015,676 | 10/1935 | Heiser | 106—110 |
| 2,557,083 | 6/1951 | Eberl | 106—110 X |
| 3,199,997 | 8/1965 | Johnson | 106—110 |
| 3,337,298 | 8/1967 | Ruter et al. | 106—110 X |

FOREIGN PATENTS 245,270   6/1963   Australia.

HAROLD ANSHER, *Primary Examiner.*